United States Patent

Sackmann et al.

[11] Patent Number: 4,614,759

[45] Date of Patent: Sep. 30, 1986

[54] SURFACE SIZING AGENTS FOR PAPER

[75] Inventors: Günter Sackmann, Leverkusen; Ulrich Beck, Bornheim; Heinz Bäumgen, Leverkusen, all of Fed. Rep. of Germany

[73] Assignee: Bayer Aktiengesellschaft, Leverkusen, Fed. Rep. of Germany

[21] Appl. No.: 762,601

[22] Filed: Aug. 5, 1985

[30] Foreign Application Priority Data

Aug. 16, 1984 [DE] Fed. Rep. of Germany ....... 3429961

[51] Int. Cl.⁴ ............................................. C08L 35/02
[52] U.S. Cl. .................... 524/549; 524/559; 525/327.7; 526/318; 526/324
[58] Field of Search ............... 524/549, 559; 525/327.7; 526/318, 324

[56] References Cited

U.S. PATENT DOCUMENTS 4,152,312  5/1979  Sackman .......................... 524/549
4,359,325 11/1982  Dawans ............................ 524/549

*Primary Examiner*—Paul R. Michl
*Attorney, Agent, or Firm*—Sprung Horn Kramer & Woods

[57] ABSTRACT

Surface sizing agents for paper containing aqueous or aqueous-alcoholic alkali metal, amine or ammonium salt solutions of copolymers of maleic anhydride and diisobutylene and, if appropriate, a vinyl monomer of the formula

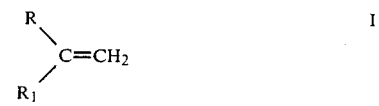

in which
R designates H, —CH$_3$, —C$_2$H$_5$, —OR$_2$, —O—COCH$_3$,

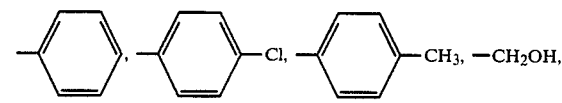

or —CH$_2$—O—COCH$_3$,
R$_1$ designates H or —CH$_3$ and
R$_2$ designates alkyl, the anhydride groups of the copolymers being bis-esterified to the extent of 25–90 mol % with primary aliphatic monoalcohols with 1 to 12 C atoms.

7 Claims, No Drawings

SURFACE SIZING AGENTS FOR PAPER

The invention relates to surface sizing agents for paper and paper-like materials which are based on copolymers, partially bis-esterified with aliphatic monoalcohols, of maleic anhydride, diisobutylene and, if appropriate, a vinyl monomer and which give an excellent sizing effect on grades of paper of varying composition and have only very little or no tendency at all to foam in sizing liquors containing starch.

There is indeed already a number of anionic surface sizing agents based on alternatingly built up copolymers of maleic anhydride and diisobutylene, such as those described in German Offenlegungsschriften No. 2,361,544, 2,501,123 and 2,701,760. These sizing agents have excellent sizing actions, but also have some technological disadvantages, such as, for example, their tendency to foam which arises under certain conditions in practice. This foaming, which is frequently to be observed in the size press liquor, can have various causes; for example, the hardness of the water, the type of starch used or the apparatus circumstances on the paper machine. European Patent Application A1-0,009,185 indeed gives instructions for the preparation of a lowfoaming surface sizing agent for paper in the form of aqueous or aqueous-alcoholic alkali metal, amine or ammonium salt solutions of copolymers of maleic anhydride and diisobutylene and/or terpolymers of maleic anhydride, diisobutylene and a vinyl monomer which copolymerises with maleic anhydride, the copolymers and terpolymers containing carboxylic acid half-amide groups. However, when this sizing agent has been used in practice, it has been found that its tendency to foam —although slight —is in many cases nevertheless still too high, so that there is still the need to develop new surface sizing agents with an even lower tendency to foam and at the same time the same good sizing properties.

The present invention relates to surface sizing agents for paper and paper-like materials, such as card or pasteboard, containing aqueous or aqueous-alcoholic alkali metal, amine or ammonium salt solutions of copolymers of maleic anhydride and diisobutylene and, if appropriate, a vinyl monomer of the formula

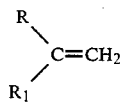
                    I in which
R designates H,—$CH_3$, —$C_2H_5$, —$OR_2$, —$OCOCH_3$,

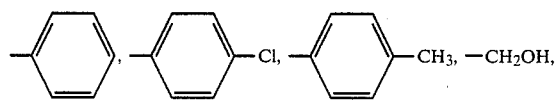
—$CH_3$, —$CH_2OH$, or —$CH_2$—O—$COCH_3$,
$R_1$ designates H or —$CH_3$ and
$R_2$ designates alkyl,
the anhydride groups of the copolymers being bis-esterified to the extent of 25-90 mol % with primary aliphatic monoalcohols with 1 to 12 C atoms.

The new sizing agents are distinguished by the fact that, when used on the size press of a paper machine, they develop little or no foam and at the same time have excellent sizing properties.

Although the half-ester products of the abovementioned copolymers are known as very effective sizing agents, they have a marked tendency to foam, which is clearly to be observed both during the preparation process and during their use on the paper machine. By further reaction of the polymeric half-esters with monoalcohol to give partial bis-esters, the foaming of these substances is then greatly suppressed - without their excellent sizing action being impaired.

Examples of vinyl monomers of the formula (I) which are suitable for the preparation of the terpolymers are isobutylene, styrene, α-methylstyrene, allyl alcohol and isobutyl vinyl ether.

The preparation of the copolymers on which the new sizing agents are based is known from the literature.

Preferably, copolymers which have been prepared by the free radical group from 0.8–1.1 moles of maleic anhydride and 0.8–1.1 moles of diisobutylene or diisobutylene/vinyl monomer of the formula I, the molar data for diisobutylene relating to the content of 2,4,4-trimethylpent-1-ene, are used.

Substances which form free radicals, such as, for example, peroxides, hydroperoxides, peresters and azo compounds, and redox catalyst systems can be employed to trigger off this copolymerisation.

The polymerisation can be carried out under normal pressure in bulk or, preferably, in solution. If it is carried out in solution, preferred solvents are those in which both the monomers and the copolymers dissolve, for example aromatics, such as benzene and toluene, halogenated aromatics, such as chlorobenzene and chlorotoluene, lower ketones, such as acetone and ethyl methyl ketone, esters of lower fatty acids, such as ethyl acetate, chlorinated aliphatic hydrocarbons, such as chloroform and carbon tetrachloride, ethers, such as tetrahydrofuran, and highly polar solvents, such as dimethylformamide or dimethyl sulphoxide. The polymerisation temperature is between 20° and 150° C., but preferably between 30° and 120° C.

Examples which may be mentioned of the monoalcohols to be employed are: methanol, ethanol, n-propanol, isopropanol, n-butanol, isobutanol, sec.-butanol, n-pentanol, isoamyl alcohol, n-hexanol, n-octanol, n-dodecanol and 2-ethylhexanol.

However, mixtures of these alcohols can also be employed.

The reaction of the copolymers of maleic anhydride and diisobutylene or of the terpolymers of maleic anhydride, diisobutylene and a vinyl monomer of the formula (I) is carried out in solution or suspension in the presence of an entraining agent for the water of reaction which is split off, such as, for example, benzene, toluene or xylene, at the boiling point of the particular entraining agent. If low-boiling alcohols are employed for the esterification, the reaction is carried out under pressure. The temperature range of the esterification reaction is in general between 80° and 170° C.

To accelerate the esterification reaction, acid catalysts, such as, for example, sulphuric acid or p-toluenesulphonic acid, can be added to the reaction mixture in amounts of between 0.1 and 5% by weight, based on the polymer employed.

p-Toluenesulphonic acid in an amount of between 0.5 and 2% by weight is preferred here. However, the esterification reaction can also be carried out by a procedure in which a half-ester is first formed between the copolymer or terpolymer and the monoalcohol and some of the carboxyl groups are then converted into the bis-ester by addition of further monoalcohol together with the acid catalyst, water being split off. The half-ester formation can be carried out either in bulk, in suspension or in a solvent at temperatures between 80 and 160 preferably at 100°–140° C. The subsequent bis-esterification is then carried out under the above-mentioned reaction conditions. The reaction time is between 4 and 24 hours. As a rule, the reaction is regarded as ended when no further water of reaction is split off.

It is of course also possible to copolymerise diisobutylene directly with a mixture of maleic acid half-ester and maleic acid bis-ester, which are obtainable by direct esterification of maleic anhydride with the corresponding monoalcohols, under the same conditions such as are customary in diisobutylene/maleic anhydride copolymerisation, to give the corresponding copolymers.

Since the esterification of the maleic anhydride monomer units is never carried out quantitatively, and carboxyl groups and, to a small extent, also cyclic anhydride groups thus always remain, the esterified copolymers and terpolymers can be converted into water-soluble salts by neutralisation with aqueous alkali metal, ammonia or amine solutions.

The salt formation can be effected, for example, by the hydroxides of the alkali metals, such as sodium hydroxide and potassium hydroxide, ammonia or primary, secondary or tertiary amines, such as methylamine, dimethylamine, ethanolamine, triethylamine, diethanolamine or triethanolamine.

Since —as can be seen from IR spectra - anhydride units which have not yet reacted are always also present in the copolymers and terpolymers, in addition to the half-ester and bis-ester groupings, the reaction with the aqueous alkali metal, ammonia or amine solutions also leads to the formation of half-amide/half-ammonium salts, which are likewise water-soluble.

These aqueous solutions are outstandingly suitable as anionic non-foaming paper sizing agents in the acid and neutral range in the production of alum-containing, alum-free, pre-sized and wood-containing paper, which can contain various fillers, such as kaolin, chalk and $TiO_2$.

In practice, a technical grade mixture of 2,4,4-trimethylpent-1-ene and 2,4,4-trimethylpent-2-ene is used to prepare the maleic anhydride/diisobutylene copolymers, the pent-1-ene compound chiefly reacting to give high molecular weight copolymers.

In a preferred embodiment of the invention, the sizing agents are employed as aqueous solutions mixed with urea and urea derivatives. This mixing results in an additional sizing-intensifying effect and a great reduction in the solution viscosity of the sizing agents according to the invention. Urea derivatives which are preferably employed are those in which one or both of the nitrogen atoms are substituted by $C_1$–$C_4$-alkyl groups or $C_1$–$C_4$-hydroxyalkyl groups, such as, for example, hydroxymethyl groups. Examples which may be mentioned of such derivatives are dimethylurea, tetramethylurea and dimethylolurea. The amount of urea or urea derivatives added here is in general 10 to 200% by weight, preferably 20 to 100% by weight, based on the weight of the alkali metal, ammonium and amine salts or on the half-amide half-ammonium salts of the copolymers or terpolymers which are based on maleic anhydride and diisobutylene and are partially bis-esterified with monoalcohols.

By adding urea or urea derivatives to the polymer solutions, the concentration of these polymers in the aqueous sizing agent solution can be greatly reduced, the same sizing effect being achieved as that which can be achieved when the polymers are used by themselves but in considerably higher concentrations. The addition of urea thus means that, for example, the amount of water-soluble salt of the partially bis-esterified copolymers and terpolymers in the sizing agent solution can be greatly reduced without the excellent sizing properties of the products deteriorating.

The surface sizing agents according to the invention for paper can be employed by all the processing methods customary for surface sizing in papermaking. The sizing agents can be used either by themselves or in combination with dispersions of plastics. They are insensitive towards foam-promoting influences, such as, for example, adverse apparatus conditions and high levels of hardness in the water used for the papermaking, so that the surface sizing agents for paper can be used in virtually all cases without foaming, which interferes in the production process, and without the addition of antifoaming agents. The products according to the invention, either by themselves or in combination with sizing agents which are added to the paper pulp, are suitable for surface sizing of most customary grades of paper, such as, for example, alum-containing, alum-free, kaolin-filled, chalk-filled, $TiO_2$-filled, neutral, acid, unsized, presized and wood-containing paper and paper containing waste paper.

The percentages in the following examples always relate to the weight.

EXAMPLE 1

Preparation of the surface sizing agent for paper

A solution of 3,998 g of maleic anhydride in 5,000 g of xylene is initially introduced into a 40 liter steel autoclave, onto which is built a device for removing water with the possibility of recycling solvent into the kettle.

The reactor is then flushed with nitrogen and the internal temperature is brought to 100° C. While passing further nitrogen over, 6,528 g of diisobutylene (technical grade mixture of 2,4,4-trimethylpent-1-ene and 2,4,4-trimethylpent-2-ene) and a solution of 128 g of azobisisobutyronitrile (AIBN) in 4,080 g of xylene are simultaneously pumped into the autoclave via two metering pumps in the course of 4 hours. When the metering has ended, the mixture is stirred at 100° C. for a further 6 hours and 306 g of isobutylene and a solution of 38 g of t-butyl per-2-ethylhexanoate in 306 g of xylene are then added, also simultaneously, in the course of 30 minutes. Thereafter, the mixture is stirred at 10° C. for a further 2 hours and the kettle temperature is then increased so that the solvent mixture starts to boil. About 2,000 g of a solvent mixture, the main constituent of which is 2,4,4-trimethylpent-2-ene, are then removed from the kettle via the apparatus for removal of water.

When the distillate has been removed, the temperature of the solvent mixture is reduced to 110° C. and a solution of 3,774 g of n-butanol and 67.5 g of p-toluenesulphonic acid in 4,080 g of xylene is forced into the kettle and the temperature is again increased until the reaction mixture boils vigorously, azeotropic removal of the water of reaction taking place. The solvent which is removed at the same time as the water is continuously recycled to the autoclave. When no further water passes over, after an esterification reaction of about 21 hours, the kettle temperature is reduced to 70° C. and 30 g of triethylamine are added.

The polymer solution formed is introduced continuously into a 100 liter stirred kettle which is surmounted by a condenser and contains a solution, warmed to 60° C., of 5,100 g of urea in 52,000 g of water. The polymer is thereby precipitated as a fine white powder, the solvent being distilled off under a vacuum of about 100 mbar. When no further solvent passes over, the precipitated product is dissolved by adding 5,220 g of an aqueous 25% strength by weight ammonia solution and is freed from solvent and monomer residues by degassing by applying a vacuum of 180-36 mbar at a temperature of 50° C. The resulting polymer solution is brought to a solids content of 20.6% by weight by dilution with water. Viscosity of the 20.6% strength solution: 122 mpas (20° C.)

This solution can be employed directly for surface sizing of paper, as can be seen from Use Examples 1 and 2 below.

EXAMPLE 2

105 g of an alternating copolymer of maleic anhydride and diisobutylene with a number-average molecular weight of about 40,000 are suspended in 300 g of toluene in a 2 liter three-necked flask surmounted by a water separator, and the suspension is heated to 115° C. 25.5 g of n-hexanol and 0.75 g of p-toluenesulphonic acid are then added and the mixture is heated at the boiling point until no further water separates off. After 24 hours, 1.7 ml of water have separated off. 0.5 g of triethylamine is then added to the polymer solution formed, and this solution is introduced at a temperature of 50° C. into a stirred vessel which is under a vacuum and contains a solution of 68 g of urea in 1.5 liters of water. The partially bis-esterified copolymer thereby precipitates as a white powder. This aqueous suspension is kept under a vacuum until no further solvent passes over. Thereafter, 50 g of a 25% strength aqueous ammonia solution are added. After the mixture has been stirred at 50° C. for 1 hour, a clear aqueous solution is formed and is freed from residual amounts of solvent by degassing under a vacuum of 30 mbar. The degassing is continued until the solution has a solids content of 15% by weight. Viscosity of the 15% strength solution: 93 mpas (20° C.)

Further surface sizing agents can be prepared by reaction with other monoalcohols, such as, for example, n-pentanol, 2-ethylhexanol, n-octanol and n-dodecyl alcohol, in accordance with the instructions given in Preparation Examples 1 and 2.

USE EXAMPLE 1

The following use examples are intended to demonstrate the low foaming tendency and the excellent sizing action of the surface sizing agents, according to the invention, for paper. The foaming properties were investigated here in the following manner:

0.4% by weight of active substance is dissolved in a sizing liquor consisting of 5% by weight of commercially available starch (Perfectamyl A 4692 R) and the liquor is warmed to 60° C. 200 ml of this sizing liquor are passed from an aluminium vessel, which has a circular opening 4 mm in diameter on its underside (Ford cup), from a height of 60 cm in free fall into a graduated glass beaker. The volume in ml of the foam which forms over the surface of the liquid is determined once immediately and after the liquid has stood in air for 1 minute. The first value provides information on the tendency of the sizing agent to foam and the second value provides information on the speed at which the foam breaks or its stability.

A half-ester product prepared according to German Offenlegungsschrift No. 2,361,554 and a half-amide product obtainable according to European Patent No. 0,009,185 were employed here as comparison substances.

TABLE

|  |  | Foam volume in ml | |
|---|---|---|---|
|  |  | immediate | after 1 minute |
| Sizing agent according to the invention | | | |
| according to Example 1, | esterified with n-butanol | 70 | 40 |
| according to Example 1, | esterfied with n-pentanol | 60 | 50 |
| according to Example 2, | esterfied with n-pentanol | 60 | 40 |
| according to Example 2, | esterfied with n-hexanol | 100 | 90 |
| according to Example 2, | esterfied with n-octanol | 100 | 100 |
| according to Example 2, | esterfied with n-dodecanol | 120 | 110 |
| Sizing agent according to German Offenlegungsschrift 2,361,544 | | 200 | 160 |
| Sizing agent according to European Patent 0,009,185 | | 150 | 120 |

USE EXAMPLE 2

The sizing action of the sizing agents according to the invention was tested on four different types of paper which had the following composition:
(a) Alum-free paper:
  50% conifer cellulose, 50% hardwood cellulose, 9.5% clay ash, pH value in the headbox: 7.5; wet up-take in a laboratory size press: about 85%; paper weight: 80 g/m².
(b) Alum-containing paper:
  50% of conifer cellulose, 50% of hardwood cellulose, 1% of alum, 11.2% of clay ash, pH value in the headbox: 4.4; wet up-take: about 80%; paper weight: 80 g/m².
(c) Presized paper:
  50% of conifer cellulose, 50% of hardwood cellucose, 1% of alum, 0.1% of Bewold size, 11.1% of clay ash, pH value in the headbox: 4.5; wet up-take: about 70%; paper weight: 80 g/m².
(d) Wood-containing paper:
  40% of conifer cellulose, 60% of mechanical wood pulp, 14.1% of clay ash, pH value in the headbox: 4.5; wet up-take: about 50%; paper weight: 75 g/m².

The paper was sized on a laboratory size press from Mathis, Zurich, Switzerland, type HF. A solution of 5% by weight of commercially available starch and 0.13, 0.16 and 0.20% by weight of the sizing agent to be tested (calculated as 100% pure active substance) in 94.87, 94.84 and 94.80% by weight of water was used as the sizing liquor.

The surface-sized paper was dried on a drying drum at about 100° C. in the course of one minute. Before testing the sizing, the paper was conditioned at room temperature for 2 hours.

To evaluate the degree of sizing of the surface-sized paper, the Cobb values (according to DIN 53 132) were determined and ink floating tests were carried out. For the ink floating tests, the paper was cut into strips 3 cm wide and 9 cm long and placed on blue test ink. After the various testing times for the individual types of paper (alum-free: 7 minutes, alum-containing: 20 minutes, presized: 10 minutes, wood-containing: 5 minutes), the samples of paper were removed from the ink, squeezed off on the reverse side on blotting paper and, after 5 minutes, evaluated. For qualitative determination of the penetration of the ink through the paper and hence the degree of sizing, evaluation was made by numbers 1 to 5, the numbers specifically denoting as follows:

| | |
|---|---|
| 1 | no penetration of the ink |
| 2 | 5–10% penetration of the ink |
| 3 | 10–20% penetration of the ink |
| 4 | about 50% penetration of the ink |
| 4.5(+) | about 90% penetration of the ink |
| 5 | 100% penetration of the ink |

(+)Other intermediate values can also additionally be used.

The following table shows the Cobb values of the sizing agents according to the invention on four different types of paper when three different amounts are used. To demonstrate that, in spite of substantially more favourable foaming properties of the sizing agents according to the invention, these likewise exhibit an excellent sizing action, in comparison with the surface sizing agent prepared according to European Patent No. 0,009,185, the Cobb values and the evaluations of the ink floating samples for the latter are given in the last three columns of the table.

TABLE

| Type of paper | Cobb value in g/m² with the addition of | | | Cobb value in g/m² with the addition of | | |
|---|---|---|---|---|---|---|
| | 0.13% | 0.16% | 0.20% | 0.13% | 0.16% | 0.20% |
| | of sizing agent according to the invention | | | of sizing agent according to European Patent 0,009,185 | | |
| Alum-free | 23.2 | 21.4 | 21.3 | 22.8 | 21.2 | 21.2 |
| Alum-containing | 21.0 | 20.3 | 20.1 | 20.3 | 20.1 | 19.9 |
| Presized | 19.8 | 20.4 | 18.7 | 19.9 | 20.6 | 19.6 |
| Wood-containing | 17.6 | 17.3 | 17.6 | 17.7 | 17.9 | 17.6 |

| Type of paper | Evaluation of the ink floating sample with the addition of | | | Evaluation of the ink floating sample with the addition of | | |
|---|---|---|---|---|---|---|
| | 0.13% | 0.16% | 0.20% | 0.13% | 0.16% | 0.20% |
| | of sizing agent according to the invention | | | of sizing agent according to European Patent 0,009,185 | | |
| Alum-free | 3 | 2.5 | 2 | 1.5 | 1.5 | 1 |
| Alum-containing | 3 | 2.5 | 2 | 2 | 2 | 2 |
| Presized | 2.5 | 2.5 | 2.5 | 2.5 | 2.5 | 2.5 |
| Wood-containing | 4 | 3 | 2.5 | 4 | 4 | 3.5 |

We claim:

1. Surface sizing agents for paper containing aqueous or aqueous-alcoholic alkali metal, amine or ammonium salt solutions of copolymers of maleic anhydride and diisobutylene and, if appropriate, a vinyl monomer of the formula

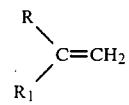

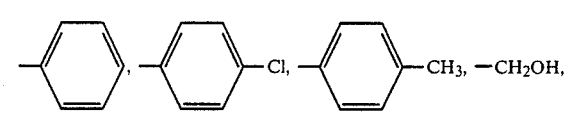

in which
R designates H, —CH$_3$, —C$_2$H$_5$, —OR$_2$, —O—COCH$_3$, or —CH$_2$—O—COCH$_3$,
R$_1$ designates H or —CH$_3$ and
R$_2$ designates alkyl,
the anhydride groups of the copolymers being bis-esterified to the extent of 25–90 mol % with primary aliphatic monoalcohols with 1 to 12 C atoms.

2. Surface sizing agents according to claim 1, characterised in that the vinyl monomer is isobutylene, styrene, α-methylstyrene, allyl alcohol or isobutyl vinyl ether.

3. Surface sizing agents according to claim 1, characterised in that methanol, ethanol, n-propanol, isopropanol, isobutanol, n-butanol, sec.-butanol, n-pentanol, isoamyl alcohol, n-hexanol, n-octanol, n-dodecanol and 2-ethylhexanol or mixtures of these alcohols are employed as primary aliphatic monoalcohols.

4. Surface sizing agents according to claim 1, characterised in that they contain urea or a urea derivative.

5. Surface sizing agents according to claim 1, characterised in that they contain urea or an N-mono- or N-di-C$_1$–C$_4$-alkyl- or an N-mono- or N-di-C$_1$–C$_4$-hydroxyalkyl-substituted urea derivative.

6. Surface sizing agents according to claim 1, characterised in that they contain 10–200% by weight of urea or urea derivative, based on the weight of the alkali metal, amine or ammonium salts.

7. Surface sizing agents according to claim 1, characterised in that they contain 20–100% by weight of urea or urea derivative, based on the weight of the alkali metal, amine or ammonium salts.

* * * * *